United States Patent
Kataria et al.

(10) Patent No.: US 11,934,673 B2
(45) Date of Patent: Mar. 19, 2024

(54) WORKLOAD AMPLIFICATION METERING AND MANAGEMENT

(71) Applicant: Seagate Technology LLC, Fremont, CA (US)

(72) Inventors: Abhay T. Kataria, Longmont, CO (US); Praveen Viraraghavan, Chicago, IL (US); Mark A. Gaertner, Shakopee, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/885,828

(22) Filed: Aug. 11, 2022

(65) Prior Publication Data

US 2024/0053910 A1  Feb. 15, 2024

(51) Int. Cl.
*G06F 3/06* (2006.01)

(52) U.S. Cl.
CPC .......... *G06F 3/0635* (2013.01); *G06F 3/0604* (2013.01); *G06F 3/0634* (2013.01); *G06F 3/0673* (2013.01)

(58) Field of Classification Search
CPC .... G06F 3/0635; G06F 3/0604; G06F 3/0634; G06F 3/0673
See application file for complete search history.

(56) References Cited

U.S. PATENT DOCUMENTS

| | | | |
|---|---|---|---|
| 7,146,467 B2 * | 12/2006 | Bearden | G06F 12/0862 711/213 |
| 8,364,999 B1 | 1/2013 | Adessa | |
| 8,397,236 B2 | 3/2013 | Gibson | |
| 8,793,372 B2 | 7/2014 | Ashok et al. | |
| 10,146,469 B2 | 12/2018 | Polkovnikov et al. | |
| 10,209,898 B2 | 2/2019 | Guo et al. | |
| 10,558,501 B2 | 2/2020 | Bradshaw et al. | |
| 10,594,779 B2 | 3/2020 | Waas et al. | |
| 10,853,139 B2 | 12/2020 | Singh et al. | |
| 2005/0137897 A1 | 6/2005 | Hoffman et al. | |
| 2013/0007380 A1 * | 1/2013 | Seekins | G06F 3/0616 711/E12.001 |

(Continued)

FOREIGN PATENT DOCUMENTS

CN  108885561 A  11/2018
WO  2017058045 A1  4/2017

OTHER PUBLICATIONS

"Annualized Workload Rate", Seagate Support US, Article, Retrieved Online from: https://www.seagate.com/support/kb/annualized-workload-rate-005902en/ , downloaded on May 27, 2022.

*Primary Examiner* — Idriss N Alrobaye
*Assistant Examiner* — Richard B Franklin
(74) *Attorney, Agent, or Firm* — Westman, Champlin & Koehler, P.A.

(57) ABSTRACT

A data storage device includes at least one data storage medium. The data storage device also includes a workload rating associated with data access operations carried out on the at least one data storage medium. The data storage device further includes a controller configured to enable performance of the data access operations, and change a rate of consumption of the workload rating by internal device management operations carried out in the data storage device in response to a change in a workload consumed by host commands serviced by the data storage device.

14 Claims, 3 Drawing Sheets

(56) References Cited

U.S. PATENT DOCUMENTS

| | | |
|---|---|---|
| 2013/0174176 A1 | 7/2013 | Kopylovitz |
| 2013/0191838 A1 | 7/2013 | Hoffman et al. |
| 2016/0210060 A1* | 7/2016 | Dreyer .................. G06F 3/0659 |
| 2017/0255491 A1 | 9/2017 | Bradshaw et al. |
| 2017/0262216 A1 | 9/2017 | Polkovnikov et al. |
| 2018/0024742 A1 | 1/2018 | Kowles |
| 2018/0136874 A1 | 5/2018 | Karve et al. |
| 2020/0225991 A1 | 7/2020 | Bradshaw et al. |
| 2020/0336322 A1 | 10/2020 | Asanghanwa et al. |

\* cited by examiner

WORKLOAD AMPLIFICATION METERING AND MANAGEMENT

SUMMARY

In one embodiment, a data storage device is provided. The data storage device includes at least one data storage medium, and a controller communicatively coupled to the data storage medium. The controller is configured to change usage of the data storage device for at least one of data read or data write operations to the data storage medium based on a workload of the data storage device and a workload rating of the data storage device. The change in the usage of the data storage device is carried out independently of any host device connected to the data storage device.

In another embodiment, a method is provided. The method includes providing at least one data storage medium in a data storage device. The method also includes changing usage of the data storage device for at least one of data read or data write operations to the data storage medium based on a workload of the data storage device and a workload rating of the data storage device. The change in the usage of the data storage device is carried out independently of any host device connected to the data storage device.

In yet another embodiment, a data storage device is provided. The data storage device includes at least one data storage medium. The data storage device also includes a workload rating associated with data access operations carried out on the at least one data storage medium. The data storage device further includes a controller configured to enable performance of the data access operations, and configured to change a rate of consumption of the workload rating by internal device management operations carried out in the data storage device in response to a change in a workload consumed by host commands serviced by the data storage device.

This summary is not intended to describe each disclosed embodiment or every implementation of workload amplification metering as described herein. Many other novel advantages, features, and relationships will become apparent as this description proceeds. The figures and the description that follow more particularly exemplify illustrative embodiments.

DETAILED DESCRIPTION OF ILLUSTRATIVE EMBODIMENTS

Embodiments of the disclosure relate to workload amplification management in data storage devices such as hard disc drives (HDDs) and hybrid drives. Field workloads (e.g., terabytes (TB)/year (Yr)) consumed keep growing and may eventually cause problems such as HDD/hybrid drive head degradation fails. Many customers utilize the drives in excess of the TB/Yr workload in the product specification. This may lead to drive failures in the field, potentially leading to poor customer sentiment about drive quality and a substantial loss of warranty money.

To address the above problems, embodiments of the disclosure track drive utilization, control the drive utilization under certain conditions, and provide drive utilization information to the customer. Current drives have tools that determine and log information related to workload consumed for host input/output (I/O) and drive internal activity. Embodiments of the disclosure leverage that information along with product specifications such as workload rating to control the drive workload in real-time. This may involve throttling back the drive's internal operations if needed. Reporting tools in the drive may be employed to provide the customer with feedback regarding the workload management. Prior to providing details regarding the different embodiments, a description of an illustrative operating environment is provided below.

Figure 1:
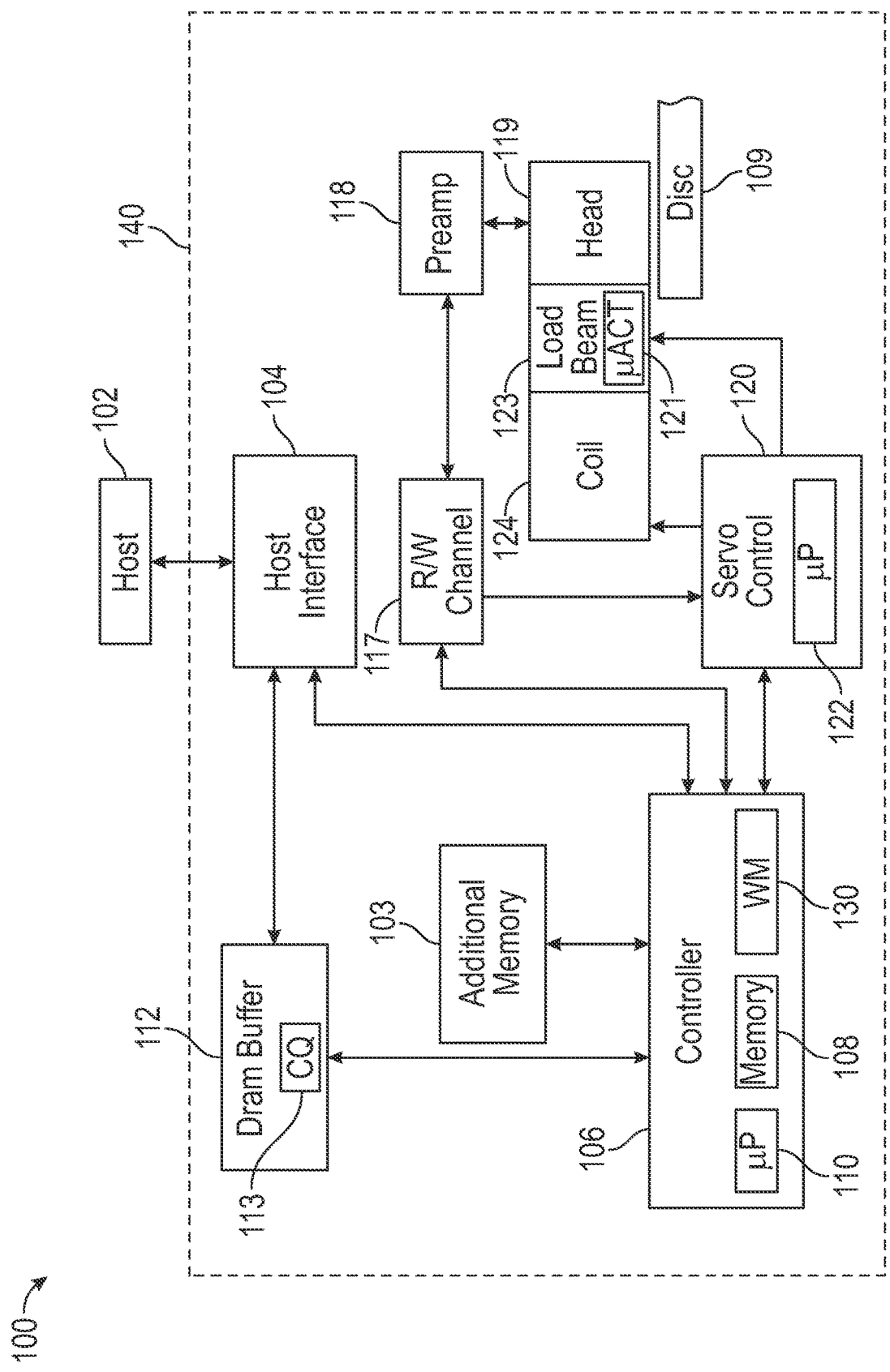
FIG. 1 is a diagrammatic illustration of a data storage system in which workload management in accordance with certain embodiments of the disclosure may be carried out.

FIG. 1 shows an illustrative operating environment in which certain specific embodiments disclosed herein may be incorporated. The operating environment shown in FIG. 1 is for illustration purposes only. Embodiments of the present disclosure are not limited to any particular operating environment such as the operating environment shown in FIG. 1. Embodiments of the present disclosure are illustratively practiced within any number of different types of operating environments.

It should be noted that same or like reference numerals may be used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

It will be understood that, when an element is referred to as being "connected," "coupled," or "attached" to another element, it can be directly connected, coupled or attached to the other element, or it can be indirectly connected, coupled, or attached to the other element where intervening or intermediate elements may be present. In contrast, if an element is referred to as being "directly connected," "directly coupled" or "directly attached" to another element, there are no intervening elements present. Drawings illustrating direct connections, couplings or attachments between elements also include embodiments, in which the elements are indirectly connected, coupled or attached to each other.

FIG. 1 is a diagrammatic illustration of a system in which workload management in accordance with certain embodiments of the present disclosure may be carried out. Specifically, FIG. 1 provides a simplified block diagram of a data storage device (DSD) 100. The DSD 100 may be coupled to a host 102 and may service commands from the host 102. The host 102 may also be referred to as the host system, host device or host computer. The host 102 can be a desktop computer, a laptop computer, a server, a tablet computer, a telephone, a music player, another electronic device, or any combination thereof. The DSD 100 can communicate with the host device 102 via a hardware or firmware-based interface 104. The interface 104 may comprise any interface that allows communication between a host 102 and a DSD 100, either wired or wireless, such as USB, IEEE 1394, Compact Flash, SATA, eSATA, PATA, SCSI, SAS, PCIe, NVMe, Fibre Channel, Ethernet, or Thunderbolt, among others. The interface 104 may include a connector (not shown) that allows the DSD 100 to be physically removed from the host 102. In some embodiments, the DSD 100 may have a casing 140 housing the components of the DSD 100, or the components of the DSD 100 may be attached to the housing 140, or a combination thereof.

DSD 100 can include a buffer (e.g., a DRAM buffer) 112 and a programmable controller 106. Buffer 112 can temporarily store data during read and write operations, and can include a command queue (CQ) 113 where multiple pending operations can be temporarily stored pending execution. Commands arriving over the interface 104 may automatically be received in the CQ 113 or may be stored there by controller 106, interface 104, or another component.

Programmable controller 106 can include associated memory 108 and processor 110. In some embodiments, the DSD 100 can include a read-write (R/W) channel 117, which can encode data during write operations and reconstruct user data retrieved from a memory, such as disc(s) 109, during read operations. A preamplifier circuit (preamp) 118 can apply write currents to one or more heads 119 (also called transducer head(s) or transducer(s)) and provides pre-amplification of readback signals. A servo control circuit 120 may use servo data to provide appropriate current to a coil 124, sometimes called a voice coil motor (VCM), to position the head(s) 119 over a desired area of the disc(s) 109. The controller 106 can communicate with a processor 122 to move the head(s) 119 to the desired locations on the disc(s) 109 during execution of various pending commands in the CQ 113.

In some embodiments, the DSD 100 may include solid state memory in addition to disc memory. For example, the DSD 100 can include an additional memory 103, which can be either volatile memory such as DRAM or SRAM, or nonvolatile memory, such as NAND Flash memory. The additional memory 103 can function as a cache and store recently or frequently read or written data, or data likely to be read soon. Additional memory 103 may also function as main storage in addition to disc(s) 109. A DSD 100 containing multiple types of nonvolatile storage media, such as a disc(s) 109 and Flash memory 103, may be referred to as a hybrid storage device.

To read or write data to a storage medium such as disc(s) 109, DSD 100 may employ servo data to properly position head 119 over a desired track. Servo data used to identify a head's location over a disc may be recorded onto disc(s) 109, interspersed between user data. Servo data may be read from disc(s) 109 by head 119 as the disc(s) 109 spin and the head 119 position is adjusted. The read servo data may be provided to preamp circuit 118. The preamp circuit 118 may preamplify and filter the readback signals from the transducer head 119, and provide the processed servo data to read/write channel 117. The R/W channel 117 can detect and condition the servo data, including application of automatic gain control and conversion of the signals to digital form.

Servo control 120 can process the digitized servo data to generate a current command signal. The current command signal may be used to apply an appropriate current to the coil 124 to position the transducer 119 over the disc(s) 109. The servo data may be used to determine a current track location of the head 119, and calculate adjustments to move to a target track, which may be called track seeking. Once the head 119 is over a desired track, the servo data may be used to maintain the head's position over the track during read or write operations, which may be called track following.

In certain embodiments, to attain fine position control of the head 119 relative to a selected data track, a head stack assembly (HSA) can include one or more micro-actuators (µACT) 121 (which may also be referred to as secondary or tertiary actuator motors) supported by a load beam or arm 123. The micro-actuator 121 can include a bipolar piezoelectric transducer that responds to positive voltage inputs by expanding in a predetermined direction, while contracting in the predetermined direction to application of a negative voltage. As the micro-actuator 121 can be affixed to a load arm of a HSA, changes in mechanical position of the micro-actuator relative to the selected data track results in changes in mechanical position of the head 119 relative to the selected data track of the disc 109, thereby facilitating fine position control of the head 119 relative to the selected data track. Structures (such as 121, 123 and 124) for supporting and moving the head 119 are collectively referred to herein as an actuator. Although a single actuator is shown in FIG. 1, multiple actuators supporting different heads 119 that communicate with one or more data storage surfaces may be employed without departing from the scope of the disclosure.

In DSD 100, write commands from host 102 may be satisfied by initially writing the data associated with the commands in a cache (e.g., in a portion of DRAM 112, in additional memory 103 and/or in a media cache on disc 109), and indicating to the host 102 that the commands are completed when the data is still in the write cache. Sometime later, the data from the write cache is transferred to main storage locations on disc 109. Host 102 read commands may be pending until the data is retrieved from the main storage locations (e.g., locations on disc 109) and returned to the host 102.

Workloads in a DSD such as 100 include host I/O such as reads and writes and drive internal activity. As noted above, a customer may utilize the DSD such as 100 in excess of the workload rating in the product specification. Accordingly, DSD 100 employs a workload manager (WM) 130 to control the rate of consumption of the workload rating, thereby helping prevent premature failure of DSD 100. The WM 130 may be one or more processors, controllers, or other circuits, or it may be a set of software instructions that, when executed by a processing device, perform the functions of the WM 130. In some embodiments, the WM 130 may be part of the controller 106, or executed by the controller 106. The WM 130 may change usage of the DSD 100 (e.g., throttle internal DSD 100 activity) based on the workload of the DSD 100 and the workload rating of the DSD 100. Non-limiting examples of DSD 100 internal activity may include read look ahead (RLA) operations, management of write caching policies, and different background operations. RLA operations involve proactively pre-fetching, or retrieving ahead of time, some additional data from disc 109 into a memory that provides faster data access (e.g., DRAM 112 or additional memory 103) after determining that a subsequent command (e.g., a subsequent read operation) from the host 102 is likely to follow a detected pattern associated with a current command from the host 102. RLA may provide requested information faster to the host 102, but may sometimes result in DSD 100 retrieving data from disc 109 that is not needed by the host 102. Thus, RLA may result in workload amplification. Other background applications may also result in a certain amount of workload amplification. Workload management to control RLA, background operations, etc., which may be carried out by WM 130, is described below in connection with FIG. 2.

Figure 2:
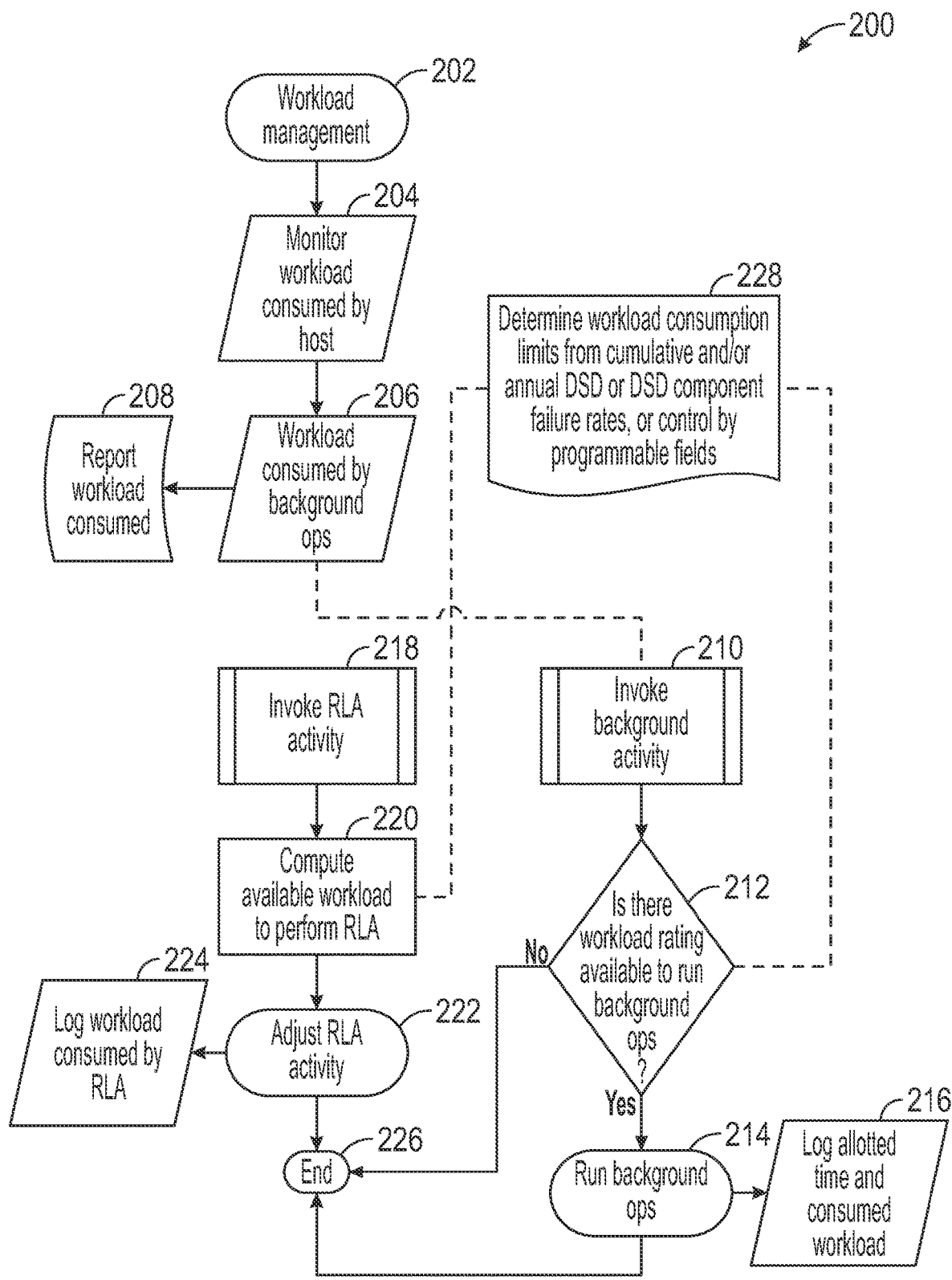
FIG. 2 is a flow diagram of a data storage device workload management method in accordance with one embodiment.

FIG. 2 is a flow diagram of a DSD workload management method 200 in accordance with one embodiment. In method 200, workload management begins at 202 and proceeds to 204 where a workload consumed by a host such as 102 of FIG. 1 is monitored. Any suitable tool in the DSD may be employed to track host operations and the workload impact in the DSD of those host operations. As indicated above, since a workload rating is a part of the DSD specification, the rate of consumption of the workload rating may be determined based on the tracked host workload and the workload rating. Similarly, at 206, workload consumed by background operations in the DSD may be tracked using any suitable tool, and the rate of consumption of the workload rating by the background operations may be determined based on the background operation workload and the workload rating. Both the workload consumed by the host operations and the workload consumed by the background operations may be reported using any suitable reporting tool/software at 208. It should be noted that the monitoring and reporting operations in 204-208 may take place independently of the remaining operations of method 200 described herein. At 210, background activity is invoked. At 212, a determination is made as to whether there is a portion of the workload rating available to run background operations. As indicated earlier, background operations may be throttled in response to changes in the rate of consumption of the DSD workload rating by the host. If a portion of the DSD workload rating is available for consumption by background operations, then the background operations are performed at 214. The allotted time and the consumed workload for the background operations carried out at 214 are logged (e.g., stored in a suitable memory of the DSD) at 216. At 218, RLA activity is invoked. At 220, a portion of the DSD workload rating available for RLA activity is computed. As indicated earlier, like background operations, RLA activity may be throttled in response to changes in the rate of consumption of the DSD workload rating by the host. At 222, RLA activity is adjusted based on the determination made at 220. The workload consumed by the RLA activity is logged (e.g., stored in a suitable memory of the DSD) at 224. After the RLA activity is adjusted and/or if there is no available DSD workload rating for consumption by background operations, the process ends at 226. It should be noted that, as shown at 228, workload consumption limits for method 200 may be determined from cumulative and/or annual DSD or DSD component failure rates or may be controlled by programmable fields.

Figure 3:
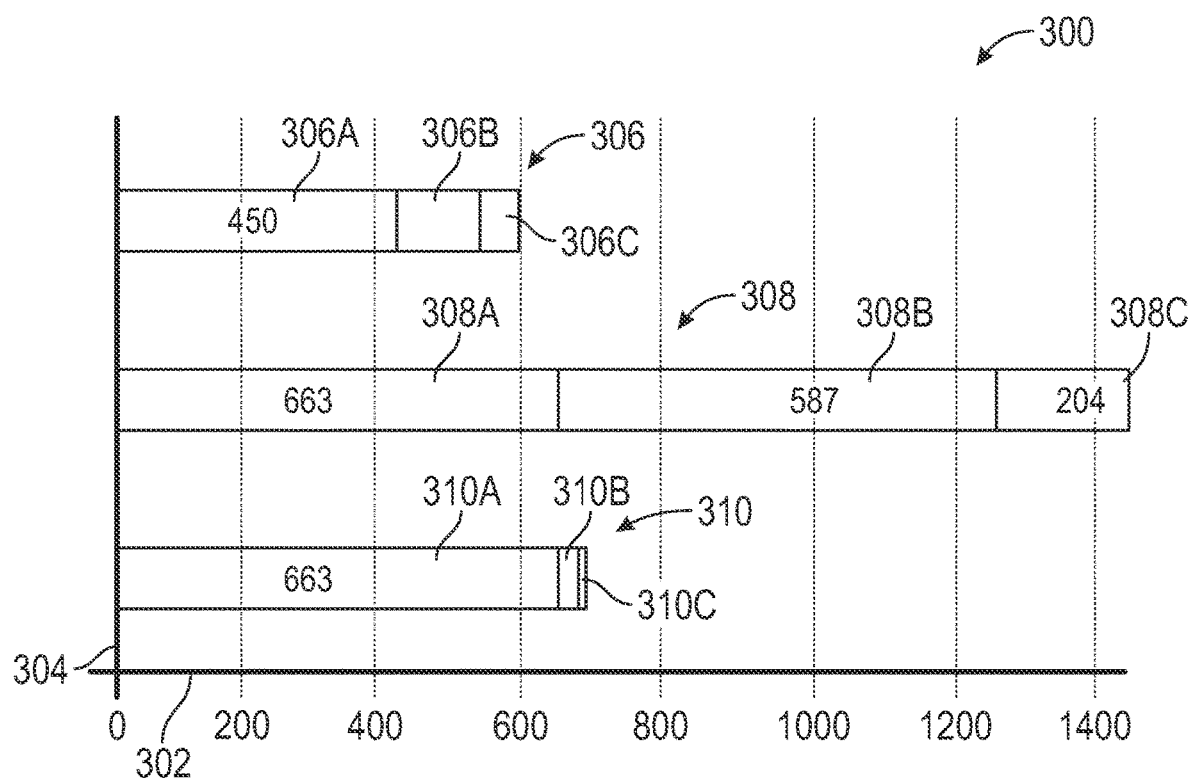
FIG. 3 is a bar graph showing workload budget comparisons with and without using the method of FIG. 2.

FIG. 3 is a bar graph 300 showing workload budget comparisons with and without using the method of FIG. 2. In FIG. 3, horizontal axis 302 represents read TB/Yr, and vertical axis 304 represents workload categories being compared. Topmost horizontal bar 306 is a DSD workload specification for read operations. In topmost horizontal bar 306, three subdivisions 306A, 306B and 306C are shown. Subdivision 306A is a host read workload specification, which is 450 TB/Yr in this example, subdivision 306B is an RLA activity workload specification, which is 100 TB/Yr in this example, and subdivision 306C is a workload specification for other background activities, which is 50 TB/Yr in this example. Middle horizontal bar 308 is an example of workload consumed in the DSD without addressing workload amplification in accordance with the method of FIG. 2. In horizontal bar 308, subdivision 308A shows the host workload consumed being 663 TB/Yr, which exceeds the workload specification of 450 TB/Yr for host reads in subdivision 306A. That value even exceeds the entire workload specification of 600 TB/Yr shown in horizontal bar 306. Similarly, subdivision 308A shows RLA activity having a consumed workload of 587 TB/Yr, which is greater than the workload specification of 100 TB/Yr in subdivision 306B. Also, subdivision 308C shows the workload consumed for background operations being 204 TB/Yr that is greater than the specification of 50 TB/Yr in subdivision 306C.

As indicated above, operating in excess of the workload specification may put the DSD at risk of failure. Therefore, the method of FIG. 2 is employed in the DSD to address this problem. Bottommost horizontal bar 310 is an example of workload consumed in the DSD when workload amplification is addressed in accordance with the method of FIG. 2. As indicated earlier, method 200 of FIG. 2 does not control the workload consumed by the host, and therefore the host workload subdivision 310A remains the same as subdivision 308A, which is 663 TB/Yr. However, the RLA activity and the other background operations may be throttled (e.g., reduced) to bring the overall workload consumed closer to the specification. Thus, as shown in subdivision 310B, RLA activity is reduced to 12 TB/Yr and other background activity is reduced to 5 TB/Yr as shown in subdivision 310C. In general, as indicated above, bringing the overall workload consumed more in line with the specification reduces the risk of premature DSD failure, and embodiments of the disclosure accomplish this without impacting host data access operations.

Figure 4:
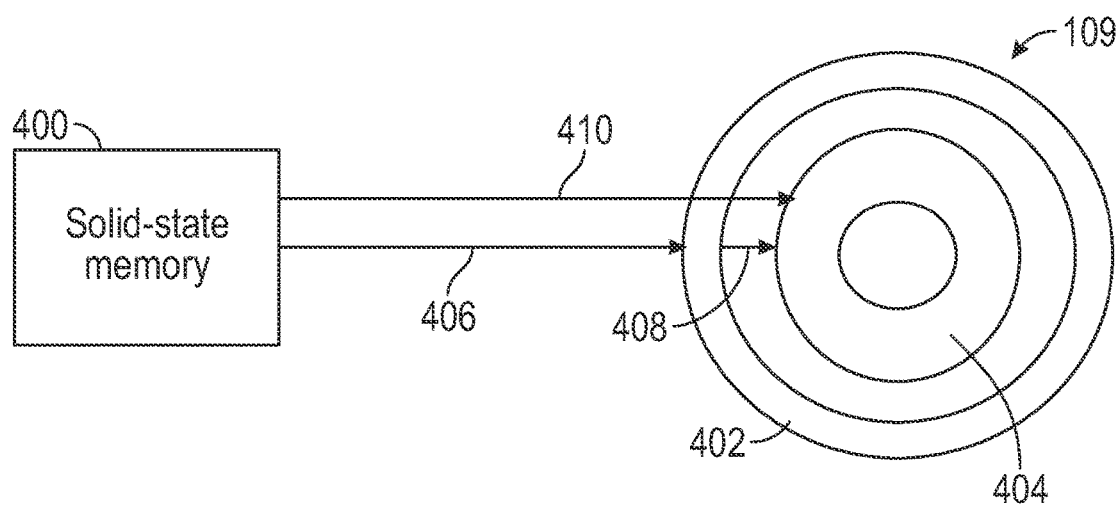
FIG. 4 is a diagrammatic illustration showing cache memories and main storage locations that may be included in the data storage system of FIG. 1.

In some DSDs, write amplification associated with data transfers from cache memories to main storage locations may also be a concern. FIG. 4 is a diagrammatic illustration showing cache memories and main storage locations that may be included in a DSD such as 100 of FIG. 1. As described above in connection with FIG. 1, in DSD 100, write commands from host 102 may be satisfied by initially writing the data associated with the commands in a cache (e.g., in a portion of DRAM 112, in additional memory 103 and/or in a media cache on disc 109), and indicating to the host 102 that the commands are completed when the data is still in the write cache. Sometime later, the data from the write cache is transferred to main storage locations on disc 109. In FIG. 4, solid state memory 400 may be DRAM 112 or additional memory 103, and disc 109 includes a media cache portion 402 and main storage locations 404. Under the control of a controller such as 106 of FIG. 1, write data may first be written into solid state memory 400, and may then be transferred to media cache portion 402 as shown by arrow 406. At a later time, data from the media cache portion 402 may be transferred to the main storage locations 404 as shown by arrow 408. When large amounts of data are to be transferred (e.g., when data transfer lengths are large), using such a two-step approach results in substantial write amplification. To mitigate write amplification, for large data transfer lengths, data is transferred directly from the solid state memory 400 to the main storage locations 402 as shown by arrow 410. Here, additional write operations to the media cache 402 are eliminated since the media cache 402 is bypassed. Embodiments of the disclosure help determine different suitable maximum data transfer lengths, above which the media cache is bypassed, under different write conditions in the DSD.

In DSDs, bytes written to the solid state memory 400 and power-on-hours (POH) of the device are typically available from existing tracking modules. Embodiments of the disclosure employ the bytes written and the POH in calculations for determining data transfer lengths under different write conditions in the DSD. In a particular embodiment, gigabytes written (GBW)/POH are periodically determined. The calculation updates may take place at a low frequency (e.g., once a day). The GBW/POH update may piggyback onto existing timer-based activities in the DSD. GBW/POH may be used alone or along with other obtained/determined values to determine the data transfer lengths. In some cases, solid state memory (e.g., DRAM) already updates cutoff transfer lengths with a partition size/queue depth detector. In some embodiments, the cutoff transfer length updates may additionally take into account the GBW/POH metric. In one embodiment, computations for the cutoff transfer length update may involve limiting the maximum transfer length to the lesser of the existing computed value, which utilizes queue depth and partition size, and a lookup value based on GBW/POH.

In a particular embodiment, the maximum transfer length value based on GBW/POH value is:

If(terabytes written(TBW)>(DSD capacity*$N$)),
where N is a scalar

Search a solid state memory transfer length table for maximum allowed transfer length
A determined maximum transfer length=Minimum (existing scheme value, search result from the solid state memory transfer length table)

An example solid state memory maximum transfer length table (included as Table 1 below) may be an array of a structure containing GBW/POH value and maximum transfer length (shown in kibibytes (KiB)).

TABLE 1

| GBW/POH | Maximum Transfer Length (KiB) |
|---|---|
| 30 | 64 |
| 35 | 32 |
| 40 | 0 |

It should be noted that the values in Table 1 above are shown as an example and may be different in different embodiments. The maximum transfer length is unconstrained by GBW/hr if GBW/hr is less than 30 GB/hr; if GBW/hr is >=30 and <35 then maximum transfer length is 64 KiB; if GBW/hr is >=35 and <40 then max transfer length is 32 KiB; if GBW/hr is >=40 then max transfer length is 0 (meaning that the solid state memory is bypassed).

In an alternate embodiment, instead of specifying the maximum transfer length for cutoff, a transfer length scalar is supplied. An example using the transfer length scalar is included below.

If(TBW>(DSD capacity*$N$)), where N is a scalar

Search a solid state memory transfer length table for the scalar
A determined maximum transfer length=existing scheme value*scalar An example solid state memory maximum transfer length table (included as Table 2 below) may be an array of a structure containing GBW/POH value and a scalar.

TABLE 2

| GBW/POH | Scalar |
|---|---|
| 30 | .5 |
| 35 | .25 |
| 40 | 0 |

It should be noted that the values in Table 2 above are shown as an example and may be different in different embodiments.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular embodiment or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments include more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A data storage device comprising:
   at least one data storage medium; and
   a controller communicatively coupled to the data storage medium and configured to change usage of the data storage device for at least one of data read or data write operations to the data storage medium based on a workload of the data storage device and a workload rating of the data storage device,
   wherein the change in the usage of the data storage device is carried out independently of any host device connected to the data storage device;
   wherein the controller is configured to change the usage of the data storage device by changing caching policies of the data storage device; and
   wherein:
      the at least one data storage medium comprises at least one data storage disc having a media cache portion and main storage portion;
      the data storage device further comprises a solid state cache memory; and
      changing the caching policies comprises changing one or more criteria that determine whether to transfer data from the solid state cache memory to the media cache portion prior to transferring the data to the main storage portion.

2. The data storage device of claim 1 and wherein the workload of the data storage device comprises a workload consumed by host commands serviced by the data storage device and a workload consumed by internal device management operations carried out within the data storage device.

3. The data storage device of claim 2 and wherein the controller is configured to further change the usage of the data storage device by changing a manner in which the internal device management operations are carried out, thereby impacting a rate of consumption of the workload rating.

4. The data storage device of claim 3 and wherein:
   the internal device management operations comprise read look ahead (RLA) activity;
   the controller is configured to change a level of the RLA activity; and
   the change in the level of the RLA activity impacts the rate of consumption of the workload rating.

5. The data storage device of claim 3 and wherein:
   the internal device management operations comprise background operation activity;
   the controller is configured to change a level of the background operation activity; and
   the change in the level of the background operation activity impacts the rate of consumption of the workload rating.

6. A method comprising:
   providing at least one data storage medium in a data storage device; and
   changing usage of the data storage device for at least one of data read or data write operations to the data storage medium based on a workload of the data storage device and a workload rating of the data storage device;
   wherein the change in the usage of the data storage device is carried out independently of any host device connected to the data storage device;
   wherein changing the usage of the data storage device comprises changing caching policies of the data storage device; and
   wherein:
      providing the at least one data storage medium comprises providing at least one data storage disc having a media cache portion and a main storage portion; and
      changing the caching policies comprises changing one or more criteria that determine whether to transfer data from a solid state cache memory of the data storage device to the media cache portion prior to transferring the data to the main storage portion.

7. The method of claim 6 and wherein the workload of the data storage device comprises a workload consumed by host commands serviced by the data storage device and a workload consumed by internal device management operations carried out within the data storage device.

8. The method of claim 7 and wherein changing the usage of the data storage device further comprises changing a manner in which the internal device management operations are carried out, thereby impacting a rate of consumption of the workload rating.

9. The method of claim 8 and wherein:
   the internal device management operations comprise read look ahead (RLA) activity;
   a level of the RLA activity is changed; and
   the change in the level of the RLA activity impacts the rate of consumption of the workload rating.

10. The method of claim 8 and wherein:
    the internal device management operations comprise background operation activity;
    a level of the background operation activity is changed; and
    the change in the level of the background operation activity impacts the rate of consumption of the workload rating.

11. A data storage device comprising:
    at least one data storage medium;
    a workload rating associated with data access operations carried out on the at least one data storage medium; and
    a controller configured to:
       enable performance of the data access operations; and
       change a rate of consumption of the workload rating by internal device management operations carried out in the data storage device in response to a change in a workload consumed by host commands serviced by the data storage device;
    wherein the controller is configured to change the rate of consumption of the workload rating by changing caching policies of the data storage device; and
    wherein:
       the at least one data storage medium comprises at least one data storage disc having a media cache portion and main storage portion;
       the data storage device further comprises a solid state cache memory; and
       changing the caching policies comprises changing one or more criteria that determine whether to transfer data from the solid state cache memory to the media cache portion prior to transferring the data to the main storage portion.

12. The data storage device of claim 11 and wherein:
    the internal device management operations comprise read look ahead (RLA) activity;
    the controller is configured to change a level of the RLA activity; and
    the change in the level of the RLA activity impacts the rate of consumption of the workload rating.

13. The data storage device of claim 11 and wherein:
the internal device management operations comprise background operation activity;
the controller is configured to change a level of the background operation activity; and
the change in the level of the background operation activity impacts the rate of consumption of the workload rating.

14. The data storage device of claim 11 and wherein the one or more criteria relate to a data transfer length from the solid state cache memory.

\* \* \* \* \*